Nov. 21, 1967     D. W. McCULLOCH     3,353,560
PULSATION DAMPING DEVICE
Filed Dec. 14, 1964     2 Sheets-Sheet 1
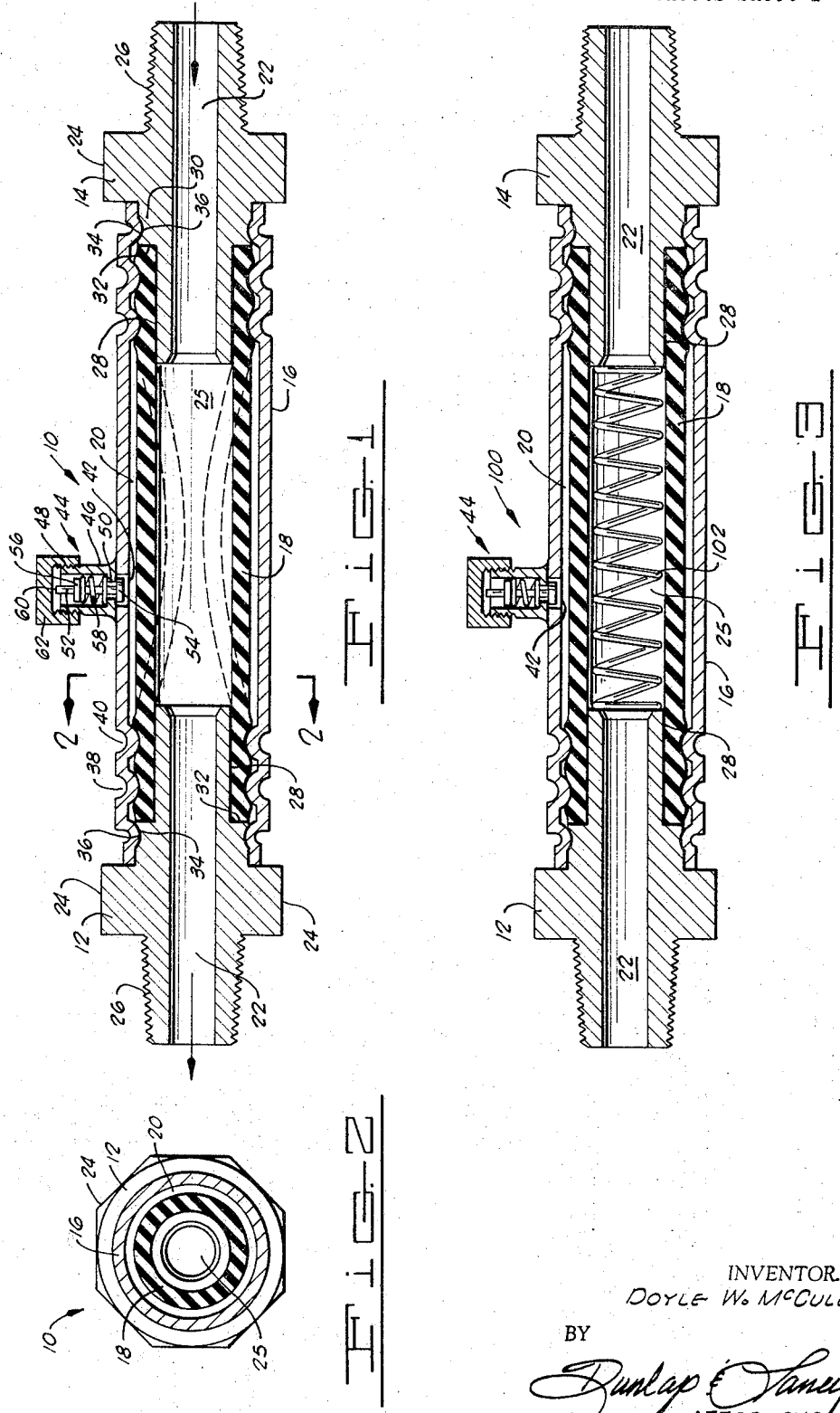
INVENTOR.
DOYLE W. McCULLOCH
BY
Dunlap & Laney
ATTORNEYS

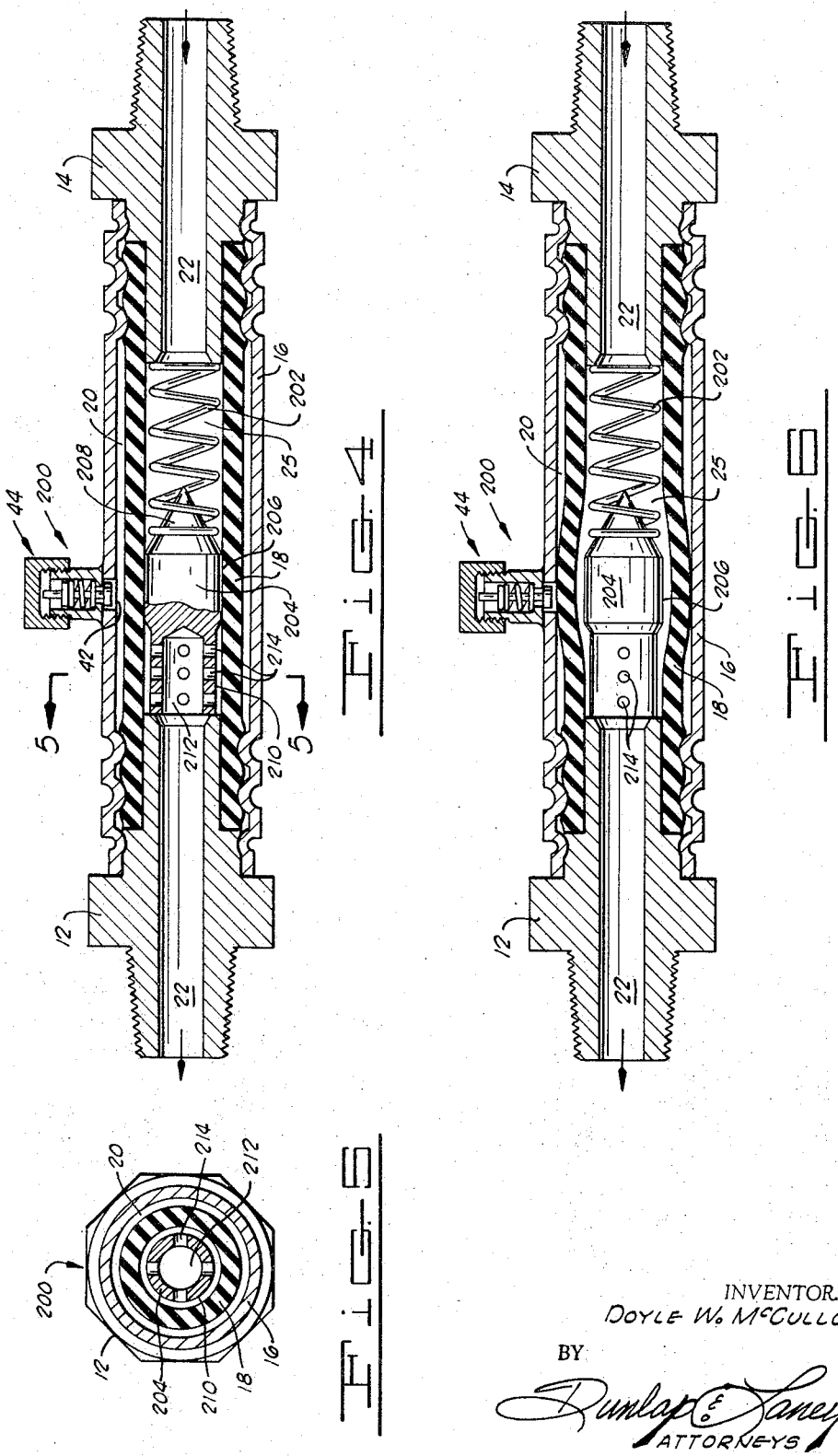

United States Patent Office 3,353,560
Patented Nov. 21, 1967

3,353,560
PULSATION DAMPING DEVICE
Doyle W. McCulloch, Blackwell, Okla., assignor to Mac/Bee Engineering Inc., Garland, Tex., a corporation of Texas
Filed Dec. 14, 1964, Ser. No. 418,067
3 Claims. (Cl. 138—30)

ABSTRACT OF THE DISCLOSURE

A device for damping pulsations from a flowing fluid including a pair of spaced end connection fittings for connecting the device to conduits through which the fluid will flow, a rigid hollow member connected between the fittings, and a resilient tubular member positioned within, spaced from, and extending generally coaxially with, the rigid hollow member. The tubular member is connected to receive fluid from the connection fittings, and defines an annulus with the rigid member. A valve is provided in the rigid hollow member to permit a compressible fluid to be located in the annulus to prevent fluid from flowing from this annulus. A coiled or helical spring-like reinforcing member is disposed coaxially inside the resilient tubular member and limits the radially inward movement of the resilient tubular member.

---

This invention relates generally to improvements in pulsation damping devices. More particularly, but not by way of limitation, this invention relates to an improved pulsation damping device for use in fluid circuits to modulate the amplitude of pressure surges or pulses occurring therein.

Many types of pulsation dampers have been constructed in the past. Most have operated with some degree of success and some have been successful commercially.

Perhaps the most common type of pulsation damper previously constructed included a hollow body having one end threaded for connection with a fluid circuit and having the other end closed, a resilient diaphragm extending across the opening in the body forming an isolated chamber with the closed end thereof, and generally some means for introducing a compressible gas under pressure into the isolated chamber. A pulsation damper of this type had to be installed in a "dead-end" position in the fluid circuit because fluid could not flow therethrough.

Generally, such an arrangement is satisfactory. However, when it is necessary to handle different fluids successively without contamination therebetween or with as little contamination therebetween as possible, pulsation dampers of the aforedescribed type prove to be unacceptable because of their tendency to accumulate a relatively large quantity of the previously carried fluid within the "dead-end."

To alleviate the foregoing described problem, pulsation dampers were developed for connection in the circuit wherein fluid could flow directly through the dampers. Such pulsation dampers included an exterior housing arranged at each end for connection with the fluid circuit and an interior concentric resilient tube forming an annulus with the housing and extending entirely therethrough whereby fluid in the circuit occurred through the inner-resilient tube. Dampers of this type depended upon the movement of air into and out of the annulus through restricted openings to provide a means of absorbing some of the pressure surges or pulsations in the fluid flowing in the circuit as the inner-resilient tube expanded and contracted. The problem of the "dead-end" was eliminated, but dampers of this type were limited to relatively low pressure ranges because the lowest pressure handled by the circuit would, in most cases, exceed the pressure of the gas in the annulus and, therefore, the resilient tube would simply be expanded into engagement with the housing and lose its effectiveness as a pulsation damper.

To enable the pulsation damper to be used with higher pressures, a rigid inner-tube was installed within the resilient tube. The rigid inner-tube was generally perforated so that fluid entering the space between the rigid inner-tube and the resilient member would not be trapped therebetween. The provision of the rigid perforated inner-tube permitted the introduction of a pressurized gas in the annulus thereby preventing collapse of the resilient tube and enabling the resilient tube to withstand a much higher pressure range of pulsations. Pulsation dampers of this type were relatively successful, but it has been found that a considerable quantity of material is trapped between the rigid inner-tube and the resilient tube thereby re-establishing the contamination problem between successively carried fluids in the circuit.

This invention relates generally to an improved pulsation damper including a pair of end fittings arranged for connection in the fluid circuit, a rigid hollow outer member having each end connected with the end fittings, a resilient tubular member having each end securely retained between the hollow outer member and the end fittings, and a valve disposed in the hollow outer member arranged to permit the introduction of the pressurized gas in the annulus or annular chamber formed between the outer member and the resilient tubular member and to prevent the flow therefrom. With the aforestated arrangement, there is provided a pulsation damping device permitting the continuous flow of fluid therethrough even when such fluid is at a relatively high pressure.

Furthermore, this invention contemplates the provision of a coiled, spring-like reinforcing member for disposition within the resilient innertube and between the end fittings that will prevent the closure of the inner-tube as pressurized fluid is introduced into the annular chamber, and yet avoids the contamination present when using a rigid inner member such as the perforated tube described hereinbefore.

One object of this invention is to provide an improved pulsation damping device that can be used in a fluid circuit without the danger of contaminating successive fluids passing therethrough.

Another object of this invention is to provide an improved pulsation damping device that can be used in fluid circuits containing relatively high pressure fluids without fear of contaminating successive fluids passing therethrough.

A further object of the invention is to provide an improved fluid pulsation damping device that effectively modulates pulsations of fluid passing therethrough.

Still another object of the invention is to provide an improved pulsation damping device that requires little or no maintenance during its service life.

One other object of the invention is to provide an improved pulsation damping device that may be easily and economically manufactured.

The foregoing additional objects and advantages of the invention will become more apparent as the following detailed description is read in conjunction with the accompanying drawing wherein like reference characters denote like parts in all views and wherein:

FIG. 1 is a cross-sectional view of a pulsation damping device constructed in accordance with the invention;

FIG. 2 is a transverse cross-sectional view of the pulsation damping device of FIG. 1 taken substantially along the line 2—2 of FIG. 1;

FIG. 3 is a cross-sectional view of another embodiment of pulsation damping device also constructed in accordance with the invention;

FIG. 4 is a cross-sectional view of another embodiment of a pulsation damping device constructed in accordance with the invention;

FIG. 5 is a transverse cross-sectional view of the damping device of FIG. 4 taken substantially along the line 5—5 of FIG. 4; and FIG. 6 is a cross-sectional view similar to FIG. 4, but showing the pulsation damping device of FIG. 4 in another stage of operation.

Referring now to the drawings and to FIGS. 1 and 2 in particular, shown therein and generally designated by the reference character 10 is a pulsation damping device constructed in accordance with the invention. The damping device 10 includes a pair of identical end fittings 12 and 14, a relatively rigid tubular member 16 connected at each end with the end fittings 12 and 14, and a resilient tube 18 having each end thereof fastened between the member 16 and the end fittings 12 and 14 whereby the tube 18 is securely retained therein and forms an annular chamber 20 between the member 16 and tube 18.

Each of the end fittings 12 and 14 has a bore 22 extending therethrough and an enlarged exterior, hexagonally configured flange 24 that may be more clearly seen in FIG. 2. The bores 22 combine with the interior of the tubular member 18 to form a continuous flow passageway 25 that extends completely through the damping device 10. The exterior of one end of each of the end fittings 12 and 14 is provided with threads 26 for connecting the device 10 into a fluid circuit. The end fittings 12 and 14 may be arranged for flange or sleeve type couplings instead of the threads 26 if desired.

The other end of each of the fittings 12 and 14 is provided with a portion of reduced diameter 28 which is sized to be received in the tube 18. An enlarged portion 30 of the end fittings 12 and 14 combines with the reduced diameter portion 28 to provide a shoulder 32 to limit the distance that the end fittings 12 and 14 extend into the tube 18. An annular groove 34 encircles the portion 30 for purposes which will become more apparent hereinafter.

In the preferred method of constructing the device 10, the tubular member 16 is slipped over the enlarged portion 30 of the end fittings 12 and 14 and attached thereto by applying a pressure roller against the exterior of the tube 18 and rotating the damping device 10 until the tubular member 16 is deformed into the annular groove 34 in the end fittings 12 and 14 as shown at 36. Also in the preferred form of constructing the damping device 10, pressure rolls are applied to the exterior of the tubular member 16 adjacent the portion of reduced diameter 28 of the end fittings 12 and 14 and pressure applied thereto until the exterior tubular member 16 is deformed as shown at 38 and 40 deforming the resilient inner tube 18 and securely retaining it between the outer tubular member 16 and the end fittings 12 and 14.

An opening 42 extends through the tubular member 16 near the medial portion thereof. Aligned with the opening 42 is a check valve 44 which is attached to the tubular member 16 to permit the introduction of a pressurized fluid into the annular chamber 20.

The check valve 44 includes a tubular body 46 attached to the member 16 in any suitable manner, such as by welding. The tubular body 46 has its upper exterior threaded as shown at 48 and an interior flange 50 near the lower end thereof adjacent the member 16. The check valve 44 also includes the movable valve member 52 disposed within the tubular body 46. The movable valve member 52 has an enlarged exterior flange 54 located on the lower end thereof. The flange 54 is sized to engage the lower surface of the interior flange 50 on the tubular body 46 to prevent the flow of fluid through the check valve 44. A second exterior flange 56 is located on the valve member 52 above the interior flange 50 of the body 46 and is engageable with a compression type spring 58 which encircles the valve member 52.

The spring 58 has its lower end in engagement with the upper surface of the interior flange 50 of the tubular body 46 so that the movable valve member 52 is continually biased into a position wherein the exterior flange 54 engages the interior flange 50 to prevent flow of fluid from the annular chamber 20 outwardly through the check valve 44. The uppermost end 60 of the valve member 52 projects slightly above the upper end of the tubular body 46 when the spring 58 is extended so that the valve 44 may be conveniently opened manually by depressing the end 60, moving the flange 54 away from the interior flange 50 and permitting fluid flow into or out of the annular chamber 20. A threaded cap 62 is connected with the tubular body 46 by the threads 48 for the purposes of protecting the check valve from accidentally being opened and to provide an additional fluid tight seal in the event that the check valve 44 should develop a leak.

The resilient inner tube 18 is preferably constructed from an elastomer that is substantially inert to the fluid in the circuit in which the damping device 10 is connected. If desired, the tube 18 may be internally reinforced in such a manner that the reinforcing will not substantially affect the flexibility of the tube.

With the pulsation damping device 10 installed in a fluid circuit (not shown), and assuming that no fluid is flowing through the flow passageway 25 or that any fluid contained therein is at a relatively low pressure, the introduction of a compressible gas under pressure into the annular chamber 20 will deform the resilient inner tube 18 until it reaches the position shown by the dash lines in FIG. 1. As the fluid flow increases in the flow passageway 25 or the pressure increases therein, it can be appreciated that the position or shape of the resilient inner tube 18 will be in accordance with the pressure differential existing between the annular chamber 20 and the flow passageway 25 extending through the damping device 10.

As illustrated in solid lines in FIG. 1, the pressure differential will be substantially equal to zero, neglecting the small area difference between the exterior of the inner tube 18 and the interior thereof.

The magnitude of the fluid pressure in the annular chamber 20 will depend upon the anticipated pressure of the fluid flowing through the damping device 10. For example, the pressure in the annular chamber 20 will be sufficient to deform the resilient inner tube 18 inwardly whereby the damping device 10 tends to restrict fluid flow as the maximum pressure of the surge or pulsation passes therethrough. In addition, fluid in the passageway 25, passing through the damping device 10 tends to force the inner tube 18 outwardly against the gas pressure in the annular chamber 20 and thereby expends a portion of its energy compressing the gas. The expenditure of such energy is reflected as a decrease in the maximum value of the pressure flowing through the damping device 10 and, therefore, as a modulation of the amplitude of the pressure surges as they pass therethrough.

If desired, the pressure in the annular chamber 20 can be increased to such a magnitude that the flow passageway through the damping device 10 will be completely closed. In this situation, no flow can occur through the damping device 10 until the pressure of the fluid increases sufficiently to drive the inner tube 18 outwardly opening the flow passageway. Normally, pressures of this magnitude would not be utilized in the annular chamber 20, but, if unusually high pressures are anticipated in the fluid passing through the damping device 10, the pressure in the annular chamber 20 will necessarily be of sufficient magnitude to prevent the deformation of the inner tube 18 outwardly against the outer tubular member 16 during the lowest pressure occurring between the high pressure peaks. Obviously, if the resilient inner tube 18 was deformed outwardly against the outer tubular member 16 during such low pressure periods it would also be held thereagainst during the high pressure peaks and would be completely ineffective as a pulsation damping device.

As can be appreciated from examining FIG. 1, there is no "dead space" wherein fluids flowing through the damping device 10 could be trapped and thereby contaminate successive fluids flowing therethrough. Furthermore, the use of a pressurized, compressible gas in the annular chamber 20 permits the efficient and effective use of the damping device 10 over a wide range of pressures and of pulse amplitudes.

FIG. 3 illustrates the identical structure disclosed in the description of the FIGS. 1 and 2, but also provides an additional structural feature. In view of the inclusion of the entire structure shown in FIGS. 1 and 2 in the embodiment of FIG. 3, all parts therein which are common to both embodiments will be designated by identical reference characters. Generally, the pulsation damping device of FIG. 3 will be designated by the reference character 100.

The pulsation damping device 100 includes the pair of end fittings 12 and 14, the outer tubular member 16 which has each end connected with the respective end fitting 12 or 14, and the resilient inner tube 18 which has its end portions securely retained between the outer tubular member 16 and the end fittings 12 and 14, respectively. The arrangement is such that a bore 22 through each of the end fittings 12 and 14 cooperates with the interior of the resilient inner tube 18 to form a continuous flow passageway 25 through the damping device 100. An annular chamber 20 is formed between the outer tubular member 16 and the resilient inner tube 18 for purposes which will be described more fully hereinafter.

The check valve 44 is operably disposed in the opening 42 extending through the wall of the tubular member 16 into the annular chamber 20. As previously described in connection with FIG. 1, the check valve 44 is arranged to permit the introduction of a compressible fluid into the annular chamber 20 and to prevent the flow of such fluid outwardly therefrom.

A coiled, spring-like member 102 is disposed within the tubular member 18 between the end fittings 12 and 14. In the preferred form of the member 102, the outer diameter thereof will be less than the inner diameter of the resilient tubular member 18 so that when the tubular member 18 is in the relaxed condition, as shown in FIG. 3, the member 102 will fit very loosely therein. The purpose of the loose fit will be explained more fully in connection with the operation of the embodiment of FIG. 3.

With the exception of the provision of the member 102, the operation of the pulsation damping device 100 is identical to the operation of the pulsation damping device 10 is explained in connection with the FIGS. 1 and 2. It has been found that reducing the magnitude of flexure of the resilient inner tube 18 will extend its life considerably. The spring-like member 102 provides a means of limiting the deformation of the tubular member 18, but at the same time avoids the formation of any "dead spaces" wherein a portion of fluid flowing through the flow passageway 25 of the device 100 may become entrapped.

It can be readily appreciated from viewing FIG. 3 that the spring-like member 102 will support the resilient inner tube 18 against inward movement even in response to relatively large pressures imposed in the annular chamber 20. It should also be noted, even when the inner tube 18 is deformed inwardly, that the fluids flowing through the passageway 25 in the damping device 100 have an extremely large unobstructed area of the inner tube 18 with which they come into contact as pulses occur in the fluid.

In addition to extending the life of the pulsation damping device, it is believed that the spring-like member 102 also permits the use of the damping device 100 with pulsating fluids which have an extremely high amplitude pulse. For example, in the damping device 10 illustrated in FIG. 1, with the pressure in the annular chamber 20 set to damp an extremely high amplitude pulse in the fluid flowing therethrough, it can be seen that the inner tube 18 may be completely closed during the lowest pressure of the pulse thereby either stopping or severely restricting flow through the damping device 10. However, with the damping device 100, having the coiled or the spring-like member 102 installed therein, it can be seen that a flow passageway will be provided through the device regardless of the magnitude of the lower portion of the pulse and even though a considerably higher pressure is imposed in the annular chamber 20 to absorb the highest pressure portions of the fluid pulses.

FIGS. 4, 5 and 6 illustrate another embodiment of pulsation damping device generally designated by the reference character 200. Basically, the pulsation damping device 200 is constructed almost identically to the pulsation damping device 10 of FIGS. 1 and 2. Therefore, the same reference numerals used in FIGS. 1 and 2 will be used to designate like parts in FIGS. 4, 5 and 6.

The pulsation damping device 200 includes the end fittings 12 and 14, the outer tubular member 16 that has each end constructed with the fittings, and the resilient inner tube 18 having each end securely retained between the outer tubular member 16 and the respective end fitting 12 or 14. The interior of the inner tube 18 cooperates with the bores 22 in the end fittings 12 and 14 to form the continuous flow passageway 25 extending through the pulsation damping device 200. The annular chamber 20 is formed between the exterior of the inner tube 18 and the interior of the outer tubular member 16. Check valve 44 is positioned in the opening 42 extending through the wall of the outer tubular member 16 to permit the introduction of a compressible gas or fluid into the annular chamber 20 and to prevent the egress of the compressible gas therefrom.

Disposed within the resilient inner tubular member 18 is a coiled, spring-like member 202 which has one end in engagement with the end fitting 14 and the other end in engagement with a restriction member 204. The spring-like member 202, although considerably shorter than the spring-like member 102 of FIG. 3, performs the same function in the same manner in the device 200 as did the spring-like member 102 in the device 100.

The restriction member 204 has an exterior portion 206 sized to engage the interior of the resilient tubular member 18, a nose portion 208 that is conical in configuration to provide the least resistance to fluid through the device 200, and the trailing or rear portion 210 of reduced diameter that is in engagement with the end fitting 12. The rear portion 210 is provided with a bore 212 which extends partially through the restriction member 204 and axially with respect to the flow passageway 25 through the damping device 200. A plurality of ports 214 extend transversely through the member 204 into the bore 212 for purposes which will become more apparent as the description proceeds.

It should be apparent from FIG. 4 that so long as the restriction member 204 remains in contact with the tubular member 18 no fluid flow can occur through the device 200. Assuming initially, that the compressible gas in the annular chamber 20 is air at atmospheric pressure, flow will occur through the device 200 when the pressure of the fluid in the interior of the tubular member 18 exceeds atmospheric pressure, displacing the resilient inner tube 18 outwardly and providing an annular space between the restriction member 204 and the tube 18 whereby fluid flows by the member 204 through the ports 214 and the bore 212 and outwardly through the end fitting 12 as shown in FIG. 6. Flow will continue until such time as the pressure of the fluid flowing decreases below atmospheric pressure. From the foregoing, it can be appreciated that the minimum pressure of fluid flowing through the damping device 200 can be controlled by regulating the pressure of the compressible gas in the annular chamber 20.

Once the flow has ceased, the gas pressure in the annular chamber 20 will deform the tubular member 18 inwardly into sealing engagement with the exterior portion 206 of the restriction member 204 and into engagement with the spring-like member 202. In addition, the resilient tubular member 18 will be deformed inwardly into engagement with the rear portion 210 of the member 204 so that any fluid which might be contained between the end fitting 12 and the exterior portion 206 of the member 204 will be forced through the ports 214 into the bore 212. Therefore, it can be seen that even though means is provided for regulating the minimum pressure which will pass through the device 200, little or no fluid can be trapped within the flow passageway 25 to contaminate subsequent fluids that may flow therethrough.

It should also be pointed out that the provision of the restriction member 204 has also been found to work very efficiently in modulating the amplitude of pulses in fluid flowing through the device 200. For example, if 100 p.s.i. gas pressure is present in the annular chamber 20, it can be seen that a fluid flowing through the passageway 25 having a pulse amplitude of from zero p.s.i. to 200 p.s.i. will be immediately cut in half, i.e., the minimum pressure for flow to occur is 100 p.s.i., therefore the amplitude of the pulse may not be more than 100 p.s.i. (200 p.s.i.—100 p.s.i.). In addition to this, a certain amount of the energy of the pulse will be absorbed as the resilient inner tubular member 18 is deformed outwardly compressing the gas in the annular chamber 20.

Perhaps three of the more important aspects of each of the embodiments described hereinbefore may be enumerated as follows:

(1) Fluid flows through each of the pulsation damping devices, that is, the pulsation devices are not installed in a T fitting wherein the fluid entering the pulsation damping device would be in a "dead end."

(2) Considerable pressure can be superimposed in the annular chamber 20 whereby the pulsation damping device can be utilized to modulate the amplitude of pulsating fluids wherein such amplitudes are of rather high magnitude.

(3) There is no "dead space" in any of the devices adjacent the fluid flow passageway wherein portions of the fluid could be trapped and later contaminate other fluids flowing therethrough.

Pulsation damping devices constructed in accordance with the embodiments described herein are relatively easily and inexpensively constructed and, yet, are extremely durable and rugged. It should be apparent upon examination of the various figures of the drawing, that little or no maintenance would be required during the service life of any of the embodiments shown.

It should be understood that the embodiments described in detail hereinbefore are presented by way of example only and that many changes and modifications can be made thereto without departing from the spirit of the invention or from the scope of the annexed claims.

What I claim is:

1. A pulsation damping device comprising:
a pair of hollow end fittings arranged for connection in a fluid circuit;
a rigid, hollow outer member connected at each end with one of said end fittings and having an opening in the wall thereof;
a resilient tubular member having the ends thereof securely retained between said end fittings and outer member, said resilient tubular member and hollow end fittings forming a flow passageway through said device and said resilient tubular member and outer member forming an annular chamber therebetween;
a coiled, spring-like member disposed in said flow passageway between said end fittings, said coiled, spring-like member being spaced radially inwardly from said resilient tubular member when said resilient member is in its relaxed, unstressed condition;
a check valve mounted in said opening arranged to permit the introduction of fluid into said annular chamber, and to prevent the egress of fluid therefrom; and,
a pressurized, compressible fluid in said annular chamber exerting a force on said resilient tubular member tending to move said tubular member into engagement with said spring-like member, whereby pulsating fluid flowing through said passageway exerts a force on said tubular member opposing the force exerted by said compressible fluid, thereby modulating the amplitude of the pulsations of said flowing fluid.

2. A pulsation damping device comprising:
a pair of hollow end fittings arranged for connection in a fluid circuit;
a rigid, hollow, outer member connected at each end with one of said end fittings and having an opening in the wall thereof;
a resilient tubular member having the ends thereof securely retained by said end fittings and outer member, said resilient tubular member and hollow end fittings forming a flow passageway through said device, and said resilient tubular member and outer member forming an annular chamber therebetween;
a check valve mounted in said opening arranged to permit the introduction of fluid into said annular chamber and to prevent the egress of fluid therefrom;
a pressurized, compressible fluid in said annular chamber exerting a force on said resilient tubular member tending to close the flow passageway through said device, whereby pulsating fluid flowing through said passageway exerts a force on said tubular member tending to open said flow passageway and opposing the force exerted by said compressible fluid, thereby modulating the amplitude of the pulsations of said flowing fluid;
restriction means disposed in said flow passageway within said tubular member and between said end fittings, said restriction means being sized for engagement with said tubular member thereby preventing flow through said flow passageway until the pressure of fluid therein is sufficient to move said tubular member out of engagement with said restriction means;
a coiled, spring-like member disposed in said tubular member and having one end thereof engaged with said restriction means and the other end thereof in engagement with one of said end fittings.

3. The pulsation damping device of claim 2 wherein said restriction means comprises a cylindrical body having:
a portion of reduced exterior diameter in engagement with the other said end fitting;
a bore in said portion of reduced exterior diameter extending partially through said body; and,
a plurality of ports extending through said portion of reduced exterior diameter into said bore, whereby fluid flowing through said flow passageway passes through said ports thereby preventing the accumulation of fluid between the exterior of said cylindrical body and said resilient tubular member.

(References on following page)

References Cited

UNITED STATES PATENTS

| | | | |
|---|---|---|---|
| 2,716,575 | 8/1955 | Vickers | 251—61 |
| 2,994,336 | 8/1961 | Bryan | 251—5 |
| 3,118,646 | 1/1964 | Markey | 251—5 |

FOREIGN PATENTS

| | | |
|---|---|---|
| 982,378 | 1/1951 | France. |
| 710,532 | 6/1954 | Great Britain. |

WILLIAM F. O'DEA, *Primary Examiner.*

H. M. COHN, *Assistant Examiner.*